3,220,879
SEALING STRIP COMPRISING POLYCHLORO-
PRENE RUBBER BASE COATED WITH COMPO-
SITION CONSISTING ESSENTIALLY OF SILI-
CONE GUM AND CHLORINATED SULFONATED
POLYETHYLENE
Donald E. Stare, Donald R. Strack, and Harold J. Reindl,
 Dayton, Ohio, assignors to General Motors Corpora-
 tion, Detroit, Mich., a corporation of Delaware
No Drawing. Original application May 19, 1960, Ser.
 No. 30,078. Divided and this application July 29,
 1964, Ser. No. 386,054
2 Claims. (Cl. 117—138.8)

The invention relates to slip coatings and is particularly concerned with slip coatings that exhibit a high degree of elongation.

This invention is a division of copending application Serial No. 30,078, filed May 19, 1960.

Slip coatings for elastomeric parts may be defined as cover coats which generally seal the surface of an elastomeric part and which improve the wear characteristics of the part to which they are applied.

The conventional slip coating is compatible with the base elastomer and is, in effect, a solvent type, pigmented cement coated onto the elastomer to form a coextensive outer surface. Compounding of this slip coating may be useful to improve abrasion resistance, lessen friction, change color, etc. In all instances, in the past, it has been our experience that the slip coat lacks the ability to stretch with the elastomeric part due to the loading. This causes rupture of the coating when the elastomer is stretched beyond the limit of elongation of the coating. Commercially available slip coatings rarely will elongate more than 100% thus limiting their usefulness.

The present invention is directed to a greatly improved slip coating which will elongate in the order of 600% without rupture and which presents a slick surface that slips well to reduce friction and lessen noise. The coating is used to great advantage on door sealing strips to decrease wear, resist abrasion and to lessen noise due to friction. It is apparent that the slip coat is also useful for many other applications.

The main object of the invention is, therefore, to provide a slip coating for elastomeric parts which comprises essentially a major portion of a rubbery ingredient together with methyl silicone gum in lesser quantities in a solvent solution with or without additional ingredients.

This coating may be applied to any of the known elastomers whether foamed or solid to provide an impervious stretchable coating that has excellent antifriction properties. We have had excellent results with the coating on parts formed from vinyls such as polyvinyl chloride, polychloroprene (neoprene), butyl rubber, natural rubber, polyurethanes, butadiene styrene copolymer rubber (GR–S), butadiene acrylonitrile copolymer rubber (GR–N), chlorinated sulfonated polyethylene such as "Hypalon," foams of the foregoing and compatible mixtures thereof. In all cases, the coating is flexible and will elongate up to 600% without rupture.

The rubbery ingredient used as the base for the cement may be chlorinated rubber, neoprene, butyl, GR–S, Hypalon, polyurethane, etc. The base is preferably similar to the elastomer to which the cement is ultimately applied but this is not essential and, in some cases, for example, where heavy service is to be encountered, it is desirable to use a more rugged base. For example, on foamed natural rubber strips, a neoprene or Hypalon coating offers better wear, etc.

The important ingredient in the coating is the silicone gum. The use of gum is of great importance since silicone oils, and resins do not provide the desired result. The gum, however, is believed to persent greater slickness due to its relative incompatibility with the polymeric base and this leads to "bleeding" which enhances the lubricating qaulities of the coating.

Furthermore, gums do not interfere with subsequent painting operations since they do not transfer readily to contacting surfaces. This may also have a bearing on the long life available as an antifriction surface. Further, gums do not lessen the physical properties of the rubbery base materials. Gums being solids by nature are not as transient as oils.

The silicone gum is the important addition to the slip coat and the ingredient that imparts the high physicals noted. This gum is a devolatilized methyl vinyl silicone polymer having a very high molecular weight in the order of 200,000. The gum has a plasticity of from 115–170 measured by A.S.T.M. procedure D #926. The vinyl group is present in quantities of about .2 mol percent. The molecule including the vinyl group is represented in part by the following structural formula:

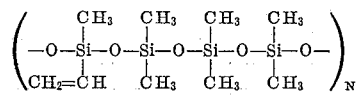

This gum may be used in quantities of from 5% to 30% of the rubbery base according to the rubbery ingredient selected. For example, the acrylics and nitrocellulose base cements are better when the gum is on the low side, between 5% to 8%, while the remaining elastomers function better between 10% to 30% with 20% being generally preferred.

The slip coat recipe may also include reinforcing agents, antiaging materials, stabilizers, softeners, etc., and vulcanizing agents and accelerators where necessary together with organic solvents as noted in the following formulas. In all instances, it is to be understood that the specific formulations may be varied widely with respect to the above materials according to the desired results. In a number of the recipes to follow, various solvents are used in combination and it is understood that, in each instance, these combinations are preferred to improve solution and control the drying of the slip coat. It is understood that single solvents may be used although, in some of these instances, the compounding of the slip coat and the coating and drying characteristics thereof are not as easily controlled. Examples of slip coats which may be used with a high degree of success embodying different rubbery ingredients are as follows.

*Example 1.—Acrylic type*

|   | Parts |
|---|---|
| Methyl methacrylate ester resin (30% solids) | 45.0 |
| Titanium dioxide | 45.0 |
| Cellosolve acetate | 10.0 |

These ingredients are ground together and are gradually diluted with a mixture of:

|   | Parts |
|---|---|
| Methyl methacrylate ester resin, (30% solids) | 172.5 |
| Butyl benzyl phthalate | 20.3 |
| Cellosolve acetate 15% | |
| Solvent (acetone 42.5%) | 245.0 |
| Toluene 42.5% | |
| Silicone gum | 4.5 |

All parts are by weight. The ester resin is originally cut to 30% solids with the solvent noted above. The coating material has a spray viscosity of 11 sec. (#4 Ford).

Example 2.—Nitrocellulose type

| | Parts |
|---|---|
| ¼ sec. nitrocellulose (65% solids in ethyl alcohol) | 85.0 |
| Castor oil alkyd resin | 192.0 |
| Modified maleic rosin ester | 40.0 |
| De-waxed shellac | 23.0 |
| Dibutyl phthalate | 36.0 |
| Methyl ethyl ketone | 27.0 |
| Methyl isobutyl carbinol | 16.0 |
| Methyl isobutyl ketone | 216.0 |
| Isopropyl acetate | 19.0 |
| Toluene | 117.0 |
| Silicone gum | 21.0 |

All ingredients are mixed in solvents to free flowing consistency. All parts are by weight.

Example 3.—Nitrocellulose type

| | Parts |
|---|---|
| ½ sec. nitrocellulose (70% solids in ethyl alcohol) | 109.0 |
| Castor oil alkyd resin | 150.0 |
| Modified maleic rosin ester | 32.0 |
| Dibutyl phthalate | 19.0 |
| Methyl isobutyl ketone | 163.0 |
| Isopropyl acetate | 28.0 |
| Methyl isobutyl carbinol | 28.0 |
| Toluene | 235.0 |
| Silicone gum | 40.0 |

This is mixed the same as Example 2 and all parts are by weight.

Example 4.—Chlorinated, sulfonated polyethlene type

| | Parts |
|---|---|
| Chlorinated, sulfonated polyethylene (Hypalon #20) | 100.0 |
| Silicone gum | 20.0 |
| Furnace black | 5.0 |
| Channel black | 2.5 |
| Graphite | 10.0 |
| Limestone | 5.0 |
| Silicone dioxide | 16.0 |
| Hydrogenated wood rosin | 2.5 |
| 2—mercaptoimidazoline | 4.0 |
| Mineral oil (light process Circo) | 10.0 |

All of the ingredients except the Hypalon and silicone gum are mixed for sixteen hours in a ball mill with xylol sufficient to create a slurry. The Hypalon and silicone gum are then added and mixed with additional xylon to bring the recipe to about 18% solids. All percentages and parts expressed by weight.

Example 5.—Neoprene type

| | Parts |
|---|---|
| Polychloroprene (neoprene) | 100.0 |
| Silicone gum | 20.0 |
| Channel black | 5.0 |
| Magnesium oxide | 2.0 |
| Tertiary butylmetacresol | 2.0 |
| Stearic acid | 0.5 |
| Zinc oxide | 5.0 |
| Sulfur | 4.0 |

The above ingredients are mixed and dissolved in xylol sufficient to bring the recipe to 18% solids. All percentages and parts are expressed by weight.

Example 6.—Butyl type

| | Parts |
|---|---|
| Butyl rubber (#165) | 100.0 |
| Carbon black | 70.0 |
| Limestone | 15.0 |
| Paraffin wax | 43.0 |

These ingredients are thoroughly milled together and the resulting material is called Butyl Master in the following recipe:

| | |
|---|---|
| Butyl Master | 230.0 |
| Zinc oxide | 9.0 |
| 2—mercaptobenzothiazole | 2.0 |
| Benzothiazyl disulfide | 4.0 |
| Sulfur | 2.0 |
| p-Quinone dioxime | 1.5 |
| Salicylic acid | 1.5 |
| Silicone gum | 20.0 |

These ingredients are dissolved in sufficient xylol in a mixer to bring the final mixture to about 18% solids content. All percentages and parts are by weight.

The butyl rubber noted is the commercially available rubbery grade comprising a polymer of isobutylene and isoprene.

Example 7.—GR–S type

| | Parts |
|---|---|
| Butadiene styrene rubbery copolymer (GR–S #1009) | 100.0 |
| 2,2' methylene-bis (4 methyl-6-tertbutylphenol) | 2.0 |
| Nickel dibutyl dithiocarbamate | 2.0 |
| Microcrystalline wax | 4.0 |
| Furnace black | 40.0 |
| Carbon black | 35.0 |
| Zinc oxide | 5.0 |
| Stearic acid | 7.0 |
| Petrolatum amber | 5.0 |
| Magnesium oxide | 2.0 |

These ingredients are mixed together on a mill or in a mixer and are termed GR–S Master in the recipe to follows:

| | Parts |
|---|---|
| GR–S Master | 189.0 |
| Limestone | 35.0 |
| High milecular weight hydrocarbon oil with aromatically in chain | 20.0 |
| Mineral oil (light process Circo) | 10.0 |
| Zinc dimethyldithiocarbamate | 2.0 |
| Sulfur | 1.75 |
| Silicone gum | 20.0 |

These ingredients are dissolved in xylol sufficient to bring the solids content to about 18%. All percentages and parts are expressed by weight.

It is apparent that, in all cases, the slip coat may be applied to the rubbery base by brushing, spraying, dipping or flow coating and that the viscosity of the slip coat will determine to some degree the thickness of the layer. If desired, repeated applications may be used to build up the desired thickness of layer.

In general, a coating having an average thickness of from 0.0002″ to 0.002″ is most useful and a layer in this range made by any of the above seven recipes will be capable of extreme elongation of the layer and the strip to which it is adhered without rupture. Furthermore, because of the stretchability of this gum layer, there is no tendency for the coextensivity of bond to be disturbed.

We have found a coating, as noted in Example 4, is particularly useful as a coating for a foamy natural rubber sealing strip of the type shown and described in Harris patent 2,579,072. A strip of this design, attached to an automotive door and coated with a .0006″ thick layer of the slip coat set forth in Example 4, showed no signs of wear after 50,000 door slams and, likewise, the door closed silently and without squeak due to the lubricated surface provided by the slip coat. A similar test conducted under identical conditions wherein the strip was coated with Hypalon cement (.0006″ thick) without the silicone gum addition gave evidence of abrasive wear which disrupted the coating. Furthermore, squeaks were in evidence due to the frictional characteristics of the strip. In addition, portions of the two test strips showed the one coated with the improved slip coat could be stretched up to six times its length without, in any way, causing injury to the slip coat while the strip coated with the Hypalon cement showed fissures in the coating after 95% elongation.

It is to be understood that the important and necessary ingredients in the slip coat are the rubbery component, the methyl silicone gum and the solvent carrier. To this may be added pigments in moderate quantities and stabilizers, anti-oxidants, curing agents, plasticizers, processing mediums and aids, etc., as are well known in the rubber compounding art. These added ingredients improve processing, curing and aging and, in general, help yield a commercial product. However, since the additions of these materials may vary widely and various equivalents may be used with equal success, it is apparent that our basic invention is directed to the concept of utilizing the silicone gum in the slip coat to improve stretchability and maintain low friction qualities.

The slip coat described herein may be applied directly to the rubbery surface of the part or to a coated surface wherein a sealing coat or other rubbery covering has been previously applied.

While the embodiments of the present invention as herein disclosed constitute preferred forms, it is to be understood that other forms might be adopted.

What is claimed is as follows:

1. A sealing strip adapted to seal a closure member to a frame member and to be carried by one of said members, said sealing strip being flexed upon each opening and closing movement of said closure member and consisting essentially of a polychloroprene rubber base and a slip coat coextensively covering the entire external surface thereof and consisting essentially of an initially fluid, chlorinated, sulfonated polyethylene cement including devolatilized methyl vinyl silicone gum having a very high molecular weight of about 200,000 and containing about .2 mol percent of vinyl group therein in quantities of about 20% by weight of the chlorinated, sulfonated polyethylene used and dispersed throughout the cement in an uncured condition, said polymer being capable of bleeding to the surface of the coating for enhancing the lubrication qualities thereof.

2. A sealing strip adapted to seal a closure member to a frame member and to be carried by one of said members, said sealing strip being flexed upon each opening and closing movement of said closure member and consisting essentially of a polychloroprene rubber base and a slip coat coextensively covering the entire external surface thereof and consisting essentially of an initially fluid, chlorinated, slufonated polyethylene cement including devolatilized methyl vinyl silicone gum having a very molecular weight of about 200,000 and containing about .2 mol percent of a vinyl group therein in quantities of between 10% and 30% by weight of the chlorinated, sulfonated polyethylene used and dispersed throughout the cement in an uncured condition, said polymer being capable of bleeding to the surface of the coating for enhancing the lubricating qualities thereof.

No references cited.

JOSEPH L. SCHOFER, *Primary Examiner.*

JAMES A. SEIDLECK, *Examiner.*